Figure 1:
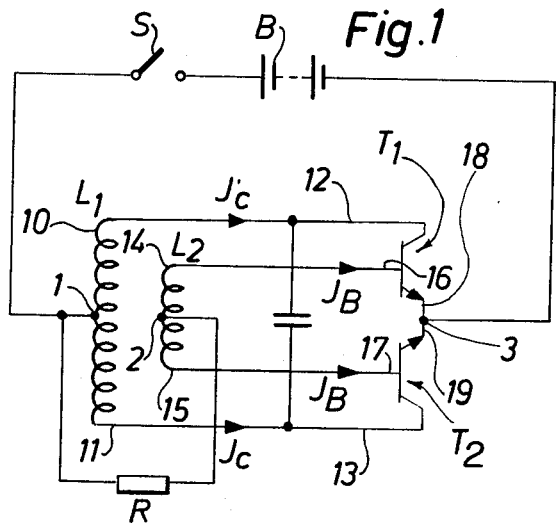

United States Patent [19]

Pozna

[11] 4,371,768
[45] Feb. 1, 1983

[54] ARRANGEMENT FOR THE SEALING OF THERMOPLASTIC-COATED PACKING MATERIAL

[75] Inventor: Laszlo Pozna, Malmö, Sweden

[73] Assignee: Tetra Pak International AB, Lund, Sweden

[21] Appl. No.: 199,504

[22] Filed: Oct. 22, 1980

[30] Foreign Application Priority Data

Oct. 23, 1979 [SE] Sweden .............................. 7908752

[51] Int. Cl.³ .......................... H05B 6/44; H05B 6/14
[52] U.S. Cl. .............................. 219/10.53; 219/10.57; 219/10.77; 219/10.79; 156/379.6
[58] Field of Search .................. 219/10.61 R, 10.57, 219/10.53, 10.79, 10.75, 10.77, 10.69, 10.71, 10.41, 10.49 R, 9.5, 10.67; 156/272, 380; 336/182, 183; 263/25; 331/100, 167, 168, 114

[56] References Cited

U.S. PATENT DOCUMENTS

| | | | |
|---|---|---|---|
| 1,912,214 | 5/1933 | Northrup | 219/10.79 X |
| 2,293,851 | 8/1942 | Rogers | 219/10.75 X |
| 2,490,081 | 12/1949 | Mittelmann | 219/10.75 X |
| 3,300,614 | 1/1967 | Sorensen | 219/10.79 X |
| 3,704,357 | 11/1972 | Moulin | 219/10.75 X |
| 3,727,982 | 4/1973 | Itoh et al. | 219/10.41 X |
| 4,104,498 | 8/1978 | Gerber | 219/10.79 X |
| 4,122,321 | 10/1978 | Cachat | 219/10.41 |

FOREIGN PATENT DOCUMENTS

| | | | |
|---|---|---|---|
| 594032 | 10/1947 | United Kingdom | 219/10.57 |
| 1513242 | 6/1978 | United Kingdom | 219/10.79 |

Primary Examiner—B. A. Reynolds
Assistant Examiner—Philip H. Leung

[57] ABSTRACT

The windings of an electromagnetic device for heat-sealing thermoplastic material having an electrically conductive layer are included as an inductive component in an oscillatory circuit, rather than merely being an external load. Two inductively coupled windings operate as a feedback element to control the alternate conduction of two transistors, to produce an oscillating signal. The core of the electromagnetic heating element has a E-shaped cross section, and the windings are wound around the middle limb of the core and are substantially surrounded by the two outer limbs to thereby substantially reduce thermal losses.

7 Claims, 4 Drawing Figures

ARRANGEMENT FOR THE SEALING OF THERMOPLASTIC-COATED PACKING MATERIAL

The invention relates to an arrangement for the sealing of packing material with the help of a high-frequency magnetic field. The arrangement comprises a d.c. energized oscillator and a sealing jaw consisting of a ferrite core with grooves for the accomodation of the oscillator windings of the oscillator.

In the technique of packaging seals are carried out frequently in such a manner that packing material, which consists of or is provided with a thermoplastic layer, e.g. polyethylene, is sealed to a similar material layer in that the layers are pressed together against each other within the intended sealing area whilst they are heated at the same time so that the thermoplastic layers melt and are joined together in a durable, mechanically strong and liquid-tight sealing joint.

In cases where the packing material is constituted of a laminate which also comprises an electrically conducting layer, e.g. a layer of aluminium foil which is located adjoining the said thermoplastic sealing layer, the heating of the thermoplastic material in the sealing area can be carried out rapidly and effectively with the help of so-called high-frequency heating. This consists in that a magnetic field of high frequency is generated with the help of a specially arranged coil, whose appearance corresponds to the intended sealing area, the said coil being applied to the combined layers. As the coil transmits a strong, high-frequency magentic field, so-called eddy currents will be induced in the electrically conducting layer of the packing material, which will then be heated locally at the points where the conducting layer is subjected to the magnetic field. Since the conducting layer is arranged adjoining the thermoplastic sealing layer, the heat generated in the conducting layer will be transmitted by convection to the thermoplastic layer which is heated to sealing temperature.

This method of achieving sealing with the help of a high-frequency magnetic field in the case where the packing material comprises an electrically conducting material, e.g. aluminium foil, has proved to be very effective and quick, and results, moreover, in very durable sealing joints. One disadvantage of the method is that it has required up to now a relatively expensive and energy-demanding high-frequency generator which as a rule is equipped with electronic tubes. The actual magnetic field is generated in special coils or windings arranged in the sealing compression jaws, which coils or windings are connected to the high-frequency generator. This connection to the high-frequency generator is troublesome, however, owing to the high frequency (approx. 1-2 MHz) of the supply voltage, and substantial thermal losses occur in the connecting leads. It has been calculated that in most cases only approx. 10% of the energy supplied to the high-frequency generator is utilized in the sealing, and, as already mentioned, great thermal losses occur in the transmission cables because of the high frequency.

The abovementioned disadvantages are avoided by means of an arrangement in accordance with the invention, which is characterized on the one hand by a core of magnetically conducting material, on the other hand by two inductively coupled windings arranged on the said core which form part of the oscillatory circuit of an oscillator, the open part of the said core ending in one and the same plane, and the said windings being located on the core inside, but in the vicinity of, the said opening plane, and are for the rest wholly surrounded by the core.

Figure 2:
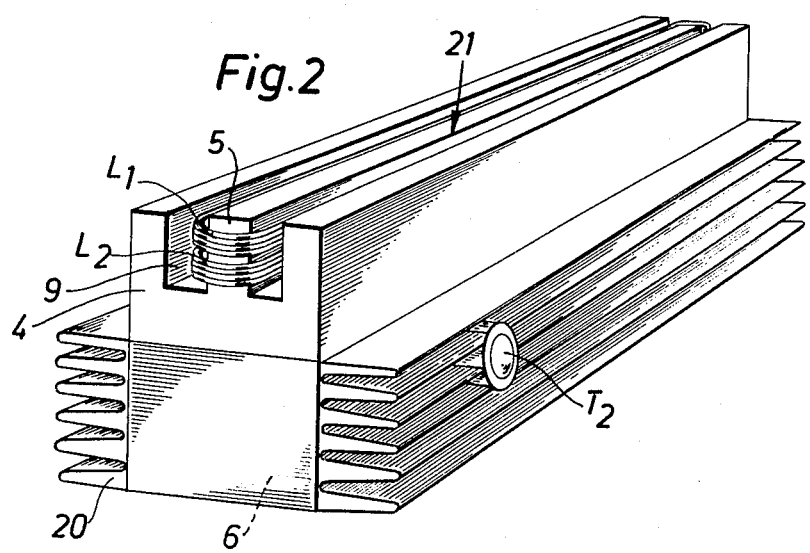
Figure 3:
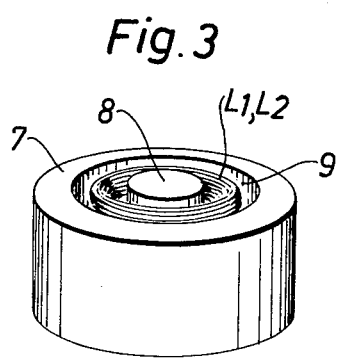
Figure 4:
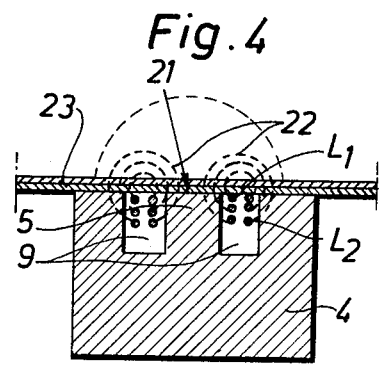

An embodiment of the invention will be described in the following with reference to the enclosed schematic drawing, wherein FIG. 1 shows a schematic circuit diagram of an oscillator, FIG. 2 shows an elongated sealing jaw, FIG. 3 shows a round sealing jaw, and FIG. 4 shows the magnetic field around a sealing jaw.

For the better understanding of the invention, the electric oscillatory circuit will be described and explained first with the help of the circuit diagram according to FIG. 1, whereupon the practical set-up of the sealing arrangement will be discussed.

The oscillatory circuit shown in FIG. 1 comprises an oscillator circuit consisting of two coils or windings $L1$ and $L2$ which are inductively coupled to each other. The centre points 1 and 2 of the windings $L1$ and $L2$ are joined to each other via a resistor R, the size of which is not critical but which can be dimensioned to approx. 5 Ohm. The end points 10 and 11 of the winding $L1$ are connected to the collector terminals 12 and 13 respectively of the transistors $T1$ and $T2$, which in the case described here consist of two transistors coupled parallel in pairs with designation TIP35 (TEXAS product), whilst the end points 14 and 15 of the winding $L2$ are connected to the base terminals 16 and 17 of the transistors $T1$ and $T2$. The emitter terminals 18 and 19 of the transistors $T1$ and $T2$ are joined together in junction point 3, which is also connected to the negative pole of a d.c. supply B. Furthermore, a capacitor C is connected across the end points 10 and 11 of winding $L1$ to determine the oscillation frequency of the oscillator, and the centre point 1 of the winding $L1$ is connected via a circuit-breaker S to the positive pole of the d.c. supply B. The voltage of the d.c. supply is chosen bearing in mind the current desired to flow through the winding $L1$ and thus the heating effect the sealing arrangement is desired to have. When the voltage of the d.c. supply B is raised, this also means an increase of the current through the coil $L1$ and hence of the field strength of the magnetic field generated.

The function of the oscillatory circuit is as follows. When the circuit breaker S is closed the base terminals 16 and 17 of the two transistors $T1$ and $T2$ will receive a voltage at the instant of closure which corresponds to the voltage at the positive pole of the d.c. supply B, that is to say in the present case +30 V. Since at positive base voltage the transistors $T1$ and $T2$ are "conductive", one or the other of the transistors will conduct, that is to say the collector resistance between the points 12 and 18 decreases. If it is assumed that the transistor $T1$ reacts first on closure of the circuit-breaker S, that is to say, the collector resistance decreases more rapidly than on the transistor $T2$, a current will flow from the d.c. supply B via the upper part of the coil $L1$ and through the transistor $T1$ between the points 12 and 18, to be returned subsequently via the junction 3 to the d.c. supply B. This current through the transistor T is designated Ic or collector current and depends of course on the voltage and inherent resistance of the energizing current supply B and the resistance of the winding $L1$. In the present case the collector current will be between 10 and 20 Ampere, and on picking up the desired current it has to be ensured that the components included are suitably dimensioned for the current in question, that is to say the transistors must withstand a current load of 10–20 Ampere, and the winding L1 must be wound with sufficiently thick winding thread so as to permit the loading.

The heavy current through the upper part of the winding L1 between the points 1 and 10 will induce an opposite current in the winding L2, which means that the base terminal 16 of the transistor T1 receives a negative potential, whilst the base terminal 17 of the transistor T2 obtains a positive potential, and this in turn means that the current passage of the transistor T1 is cut off, owing to the collector resistance between the points 12 and 18 being instantaneously increased, whilst in return the collector resistance between the points 13 and 19 of the transistor T2 instantenously decreases to an almost negligible value. When this occurs a heavy collector current will flow through the transistor T2 via the lower part of the coil L1, thereby inducing a voltage in the winding L2, which cuts off or "chokes" the transistor T2, because the collector resistance between the points 13 and 19 increases, and at the same time "opens" the transistor T1, because the collector resistance between the points 12 and 18 decreases again to a negligible value.

In this manner the transistors T1 and T2 change to conducting, and a heavy current (in the present case 10–20 Ampere) will flow either between the points 1 and 10 of the winding L1 or between the points 1 and 11 of the same winding. This gives rise to an alternating magnetic field from the winding L1, whose magnitude depends on the number of turns of the winding and on the amperage of the current passing through the winding. The frequency of the oscillating magnetic field is determined on the one hand by the inductance of the winding L1, on the other hand by the capacitor C forming part of the circuit, which is charged and discharged in the same rhythm as the transistors T1 and T2 become conductive. Owing to the capacitor C being connected in parallel with the winding L1 a so-called parallel resonant circuit is formed which has a definite resonance frequency, and on connection of the current supply B to the circuit shown in FIG. 1 the oscillation frequency automatically adjusts itself to the actual resonance frequency. At higher values of the capacitance of the capacitor C the charging and discharging processes of the same take a longer time, so that the resonance frequency diminishes, whilst in the same manner the resonance frequency increases if a capacitor C with lower capacitance is chosen. In the present case a resonator frequency of approx. 50–60 kHz is used, and it is often possible to obtain good sealing results even with greatly reduced frequencies of e.g. 30 –40 kHz.

The advantage of the arrangement in accordance with the invention is that the windings L1 and L2 are included as an integral part of the sealing jaw, which will be described in more detail in the following, and that the remaining components forming part of the circuit, that is to say the transistors T1 and T2, the capacitor C and the resistor R, are of such small dimensions that they can easily be assembled together with the sealing jaw. Owing to the high currents, the transistors T1 and T2 must generally be provided with cooling ribs, and it may even be necessary occasionally to provide the sealing jaw itself and its windings with cooling ducts. This is no problem, however, as the sealing arrangement, even with cooling ribs attached, still has resonable dimensions. As the sealing arrangement is supplied from a d.c. supply B with low voltage any losses in the supply leads to the oscillator will be very low and wholly negligible, compared to the thermal losses which occur in the arrangements known at present, where a high-frequency voltage generated in a special generator is conducted to a coil arranged in the sealing jaw, which consequently does not form part of the oscillatory circuit of the oscillator, but representes only an external load wherein the magnetic field is generated.

In practice the sealing arrangement in accordance with the invention may be realized in the manner as shown in FIG. 2, that is to say the windings L1 and L2 are wound onto the middle limb of an elongated magnetic core 4 of E-section. This magnetic core should be made of ferrite material so that a better concentration of the magnetic field is obtained, and the windings L1 and L2 be arranged in such a manner that they are wholly accomodated in the space 9, which may be filled with a suitable thermosetting plastics or a ceramic material in order to fix the windings L1 and L2. The winding L1, through which passes the main magnetizing current (10–20 Ampere in the present case), should be arranged near the "open part" 21 of the core 4, so that the magnetic field 22 (FIG. 4) should obtain the desired concentration and strength in the area just outside the opening of the sealing jaw 4, that is to say in the area where the packing material 23 is located during the sealing operation. In the case shown in FIG. 2 the magnetic core 4 consists of an elongated core whose length substantially exceeds its width, and such a magnetic core is used in cases where it is desired to carry out elongated seals, e.g. transversely over a tube of packing material, so as to divide the tube into individual package units. As shown in FIG. 2 the transistors T1 and T2 can be arranged in cooling ribs 20 provided along the magnetic core 4, whilst the remaining components in the oscillatory circuit can be arranged in the space 6 which is formed underneath the magnetic core 4 and between the cooling ribs 20.

In FIG. 3 is shown another embodiment of the sealing arrangement in accordance with the invention. In this embodiment the magnetic core 4 is in the shape of a short cylinder with a middle limb 8 and an outer rim 7 together with an annular space 9 provided in between. In the said annular space 9 are arranged the windings L1 and L2. In the same manner as in the case described earlier, the space 9 with the windings can be filled with a ceramic material in order to fix the windings, and on the underside of the magnetic core 4 may be arranged the other components in the oscillatory circuit together with the accompanying cooling ribs.

In FIG. 4 is shown a picture of the magnetic field 22 which is formed around the windings of a sealing jaw in accordance with the invention, and which appears to be formed of two concentrated magnetic fields 22 adjacent to each other, which means that e.g. with the sealing arrangement in accordance with FIG. 2 two narrow parallel sealing zones are obtained within the areas of the packing material 23 which are situated close to the winding L1, within which zones the electrically conducting layer of the packing material 23 is strongly heated. The heating of the adjoining area will be insignificant, and very well defined sealing zones are obtained, which means that with the arrangement according to FIG. 3 an annular seal can be obtained.

Naturally it is also possible with the arrangement in accordance with the invention to provide sealing configurations other than straight and round ones, and by arranging the magnetic core 4 in the appropriate manner angular or oval sealing zones can be obtained. As mentioned earlier, it is one of the decisive advantages of the arrangement in accordance with the invention that no great losses in the connection leads are obtained, and as a further advantage may be mentioned that, just because of the high losses with the conventional high-frequency generators, it was necessary to operate with very high voltages so that the currents should not be too heavy and so that the voltage over the coil generating the magnetic field should not be too low because of any voltage drop arising in the supply circuit.

It has been found that the arrangement in accordance with the invention functions excellently, and since, moreover, it only costs a fraction of the high-frequency generators used at present, and has substantially lower losses, it is obvious that the arrangement in accordance with the invention entails a decisive advance within the technique of high-frequency sealing. It is of course possible within the concept of the invention to modify the appearance of the oscillatory circuit and of the sealing jaws, but it is the fundamental concept of the invention that the coils included in the oscillatory circuit are arranged in a magnetic core which at the same time functions as a sealing jaw, and that one of the oscillator coils represents at the same time a supply coil to the sealing jaw. It is possible, among other things, to use instead of transistors other types of controlled semiconductors, e.g. thyristors, and, as mentioned previously, several semiconductors can often be connected in parallel so as to increase the power of the sealing arrangement.

I claim:

1. Apparatus for sealing thermoplastic packing material having an electrically conducting layer, comprising:
a sealing jaw including a magnetically conductive core having an E-shaped cross-section providing a middle limb which terminates at a surface that defines a sealing plane and a recess in said surface on either side of said middle limb that opens into said sealing plane; and
a parallel resonant oscillator circuit comprising a first winding and a capacitor connected in parallel, and further including a second winding inductively coupled to said first winding for controlling the flow of current through said first winding, both said windings being disposed around said middle limb and within the recess in said core adjacent said sealing plane and being substantially entirely surrounded by core structure except for the opening to said sealing plane.

2. The apparatus of claim 1 wherein said oscillator circuit further includes a pair of semiconductors operatively connected to said windings.

3. The apparatus of claim 1 wherein said core has a length substantially greater than its width.

4. The apparatus of claim 1 wherein said core is cylindrical in shape and has an annular groove defining said recess and said middle limb around which said windings are disposed.

5. The apparatus of claim 1 wherein said core is made of ferrite.

6. Apparatus for sealing thermoplastic packing material having an electrically conducting layer, comprising:
a magnetically conductive core having a surface that defines a sealing plane and a recess in said surface that opens into said sealing plane; and
a parallel resonant oscillator circuit comprising
a first winding and a capacitor connected in parallel,
a second winding inductively coupled to said first winding for controlling the flow of current through said first winding, both said windings being disposed within the recess in said core adjacent said sealing plane and being substantially entirely surrounded by core structure except for the opening to said sealing plane,
a resistor connected between the midpoints of said windings,
a pair of semiconductors having their base terminals respectively connected to the end terminals of said second winding, their collector terminals respectively connected to the end terminals of said first winding and their emitter terminals connected to each other, and
a d.c. power supply connected between the junction of said emitters and the midpoint of said first winding.

7. The apparatus of claim 6 wherein said second winding has fewer turns and is made with a smaller wire than said first winding.

* * * * *